United States Patent [19]

Rodloff et al.

[11] 4,432,646
[45] Feb. 21, 1984

[54] ANGULAR VELOCITY SENSOR BASED ON A RING LASER

[75] Inventors: Rüdiger Rodloff; Hans Bentlage, both of Braunschweig, Fed. Rep. of Germany

[73] Assignee: Deutsche Forschungs-und Versuchsanstalt fur Luft- und Raumfahrt E.V., Fed. Rep. of Germany

[21] Appl. No.: 241,701

[22] Filed: Mar. 9, 1981

[30] Foreign Application Priority Data

Mar. 14, 1980 [DE] Fed. Rep. of Germany ....... 3009796

[51] Int. Cl.$^3$ ............................................. G01C 19/64
[52] U.S. Cl. .................................................... 356/350
[58] Field of Search ......................................... 356/350

[56] References Cited

PUBLICATIONS

"Amplitude & Frequency Characteristics of a Ring Laser", Hutchings et al., Physical Review, vol. 152, No. I, Dec. 2, 1966, pp. 467–473.
"Measurements of a Mode–Competition Discriminant in a Single Frequency Argon Ion Ring Laser", Maloney et al., IEEE J. of Quantum Electronics, vol. QE–8, No. 9, Sep. 1972, pp. 744–749.

Primary Examiner—Vincent P. McGraw
Attorney, Agent, or Firm—Salter & Michaelson

[57] ABSTRACT

An angular velocity sensor based on a ring laser, wherein at any given time beam components of oppositely directed wave trains can be decoupled, having photo-receivers for the decoupled beam components, and means for the generation of signals which correspond to intensity differences of the decoupled beam components. In accordance with the invention a photo-receiver is provided for each decoupled beam and detector means is provided to analyze the output signals from the photo-receivers both for amplitude and frequency. The detector means may consist of a subtractor, a pulse-former and a counter. A rotation-direction detector may also receive an output signal from the pulse-former and feed this as a plus or minus sign into the counter.

1 Claim, 2 Drawing Figures

ANGULAR VELOCITY SENSOR BASED ON A RING LASER

FIELD OF THE INVENTION

The invention concerns an angular velocity sensor based on a ring laser, wherein at any given time beam components of oppositely directed wave trains can be decoupled, having photo-receivers for the decoupled beam components, and means for the generation of signals which correspond to intensity differences of the decoupled beam components.

DESCRIPTION OF THE PRIOR ART

With known rotation-speed sensors of this kind, also termed laser gyroscopes, (see for example U.S. Pat. No. 3,373,650 and British Patent Specification Nos. 1,086,898 and 1,406,730), the beam components of the oppositely-directed wave trains are at any given time decoupled via a semi-transparent apex mirror. The decoupled beam components are then superimposed by means of a deviation prism. These superimposed beam components are directed on to a photo-receiver, on which a system of interference fringes is thereby generated, which moves past the photo-receiver in dependence of the angular velocity $\omega$.

The number of interference fringes recorded by the photo-receiver in unit time is proportional to the absolute value of the angular velocity $\omega$. Information about the direction of rotation can be gained from the direction of motion of the fringes. For this purpose the photo-receiver contains two photo-diodes. The signals emitted by the photo-diodes pass through pulse-formers and are then delivered to a counter. The rotation direction of the sensor is ascertained from the sense of the phase-shift of the pulses.

The deviation prism which superimposes the beam components is an optically-precise component and the adjustment of the system must be effected with interferometer accuracy. Care must also be taken that the setting of the deviation prism remains permanently in the adjusted position. With the known angular velocity sensors therefore, the signal read-out system involves a considerable production cost.

An object of the invention is to provide an angular velocity sensor of this type which is considerably simpler in design and manufacture, and with which, in particular, the deviation prism can be dispensed with.

SUMMARY OF THE INVENTION

According to the invention, this problem is solved in that for each decoupled beam component a photo-receiver is provided, and in that detector means are provided by which the output signals of the photo-receivers can be analysed both for amplitude and frequency.

Other features and advantageous embodiments of the invention are described hereinafter.

DESCRIPTION OF THE DRAWINGS

An angular velocity sensor in accordance with the invention is as an example illustrated with reference to the accompanying diagrams, in which.

DESCRIPTION OF THE PREFERRED EMBODIMENT

Figure 1:
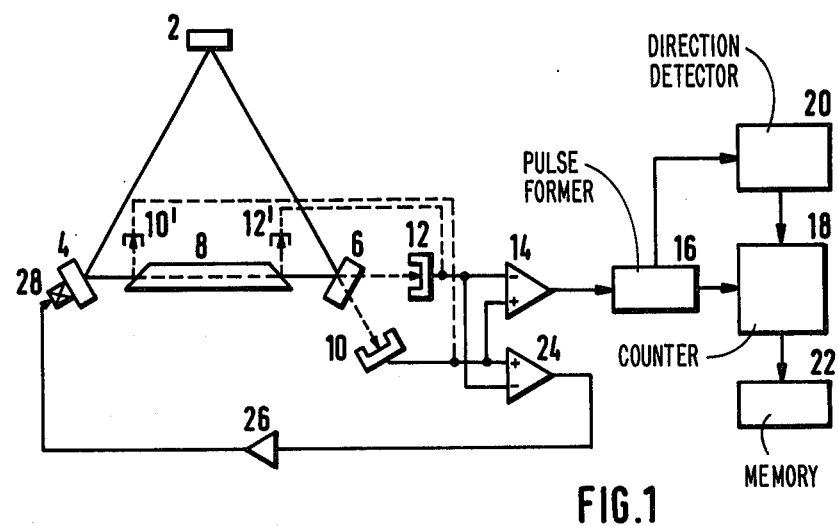
FIG. 1 shows a circuit diagram of the angular velocity sensor and a ring laser.

The ring laser shown in FIG. 1 is formed of three apex mirrors 2, 4 and 6 and a laser medium 8. For this invention, the structure of the resonance space; the type and number of the mirrors used; the construction of the optical wave guides; the type of laser medium used, and the manner of integrating the medium into the resonance space, is of no significance. The resonance space can be formed and optimised in known manner. Furthermore, as the operation of a ring laser is well known it is not described herein in detail.

In the illustrated example, the apex mirror 6 is partially transparent and continuations of the beams incident on the apex mirror pass therethrough and beam components act on photo-receivers 10 or 12. The photo-receiver 10 measures the beam component which circulates clockwise in the ring laser, and the photo-receiver 12 measures the beam component which circulates counter-clockwise. From the signals emitted by the two photo-receivers 10 and 12, the difference $(I_1-I_2)$ if formed in a subtractor 14. A pulse-former 16 forms from the difference $(I_1-I_2)$ a pulse which is conveyed to a counter 18. A signal is taken from the pulse former 16 and is treated in a rotation direction detector 20 to determine the direction of rotation. From the rotation-direction detector 20, the direction of rotation is then fed directly as a plus or minus sign into the counter 18. The state of the counter 18 (subjected to plus or minus signs) determines the magnitude and direction of the angular velocity, is then admitted to a store 22 from which a computer is fed.

The signals emitted from the two photo-receivers 10 and 12 can at the same time be used to provide a supporting signal for a control circuit to stabilise the length of the resonance space. For this purpose the signals $I_1$ and $I_2$ are delivered to an adder 24, of which the output signal, via a high-tension amplifier 26, operates a piezo-electric drive 28 on the apex mirror 4 and so displaces the mirror 2 parallel to itself and therefore alters the length of the resonance space.

The photo-receivers 10 and 12 do not need to be separate components remote from the apex mirror 6. Instead the photo-receivers 10, 12 can be integrated into the mirror itself, for example they may be attached to the rear side of the mirror, and in this an oblique incidence of the beam is unimportant since the angles of incidence are always equal for the two photo-receivers. Instead of a decoupling of beam components via an apex mirror, as described hereinbefore, the decoupling can also be conducted at the ends of the laser medium 8, which may be, for example, a gas-discharge tube disposed between the two apex mirrors 4 and 6. Such a decoupling of the beam components is shown in broken lines, with photo-receivers 10' and 12'. An arrangement of this kind has the advantage that practically no decoupling of energy from the ring laser is required. Stray beam components that are present, in any case, are further processed. Only the internal losses of the ring laser need therefore be considered in order to maintain operation. A further advantage is the smaller size of the design which results from this.

Figure 2:
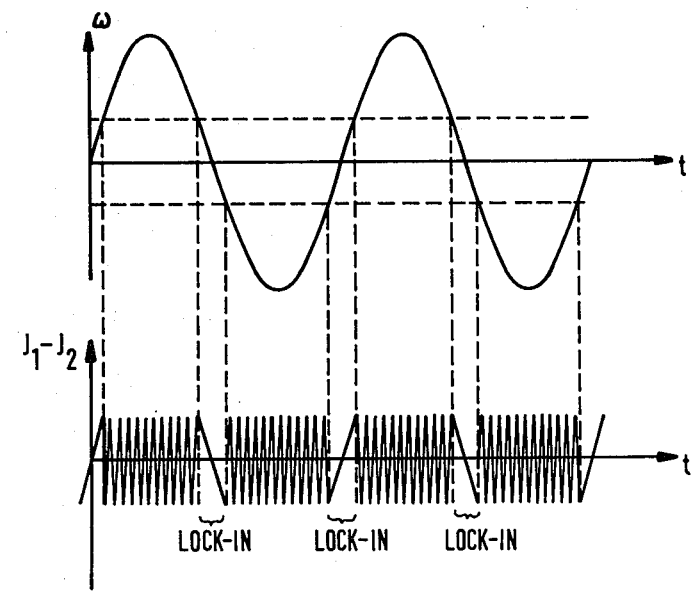
FIG. 2 shows diagrammatically variation with time of the angular velocity and the difference between the beam intensities of the ring laser.

In order to overcome the lock-in effect, it is a known procedure to cause the sensor with the ring laser to execute a periodically alternating rotary motion, or to introduce a periodic bias into the ring laser by means of magneto-optical or electro-optical procedures. By this means the course of the upper curve shown in FIG. 2, representing the variation of the angular velocity with time, emerges as the difference between the two measured beam intensities $I_1$ and $I_2$. The beam intensities $I_1$ and $I_2$ in themselves respectively contain the information concerning the angular velocity and in principle can also be evaluated separately. The evaluation of the difference between the beam intensities has advantages with regard to measuring technique.

As long as the angular velocity lies within a dead region, the so-called "lock-in region", an amplitude-modulated signal is emitted, and the quantity $(I_1-I_2)$ varies proportionately to the angular velocity, in fact according to the amplitude and the sense. Within the dead region, the signal supplied by the subtractor 14 can be interpreted as the signal of a rate gyroscope.

Within the lock-in region, the behaviour of the sensor can, in accordance with the invention, be used as an indicator of the direction of rotation. Since the sensor must traverse the lock-in region at each change of the direction of rotation and in so doing emit an $(I_1-I_2)$ signal from which the direction of rotation can be determined, it is possible to register both the sign and the magnitude of the angular velocity without additional information.

Only a few of the numerous possible embodiments of the counter 18 and direction-detector 20 will be indicated here.

With the aid of a pulse-width detector, it is first ascertained whether the sensor is in the lock-in region. If this is the case, the sign of the gradient $d(I_1-I_2)/dt$ is determined, and from that the sense of the rotary motion is inferred.

Since for the determination of the sense of the rotary motion it suffices to ascertain the sign of $d(I_1-I_2)/dt$, the counter 18 and direction-detector 20 can be constructed more simply than could a rotation-direction detector for known sensors. With the latter, in order to determine the direction of rotation, the sign of phase shaft between two series of pulses must be determined.

There are other possible embodiments of sensor.

Instead of a combination of the modulation effects of $(I_1-I_2)$ outside and inside the lock-in region, the modulation can also be augmented with other information about the direction of rotation, present in the overall system, to form a complete read-out circuit. This includes, for example, the periodic bias which must be inserted into every ring laser in order to overcome the lock-in effect. The sign of the bias is known and it can therefore be employed to control the count-direction of the pulse counter 18. Correcting circuits must then be provided for the case where the angular velocity of the overall system is greater than the bias applied.

Moreover, for the detection of the direction of rotation, the fact can be utilised that the modulation of the intensities of two oppositely-circulating wave trains exhibits familiar typical asymmetries dependent on the direction of rotation.

It is also conceivable to dispense entirely with a periodic bias for overcoming the lock-in effect, and to undertake the read-out of the signals within the lock-in region by means of amplitude-modulation of $(I_2-I_2)$, and outside the lock-in region by measurement of the frequency-modulation of $(I_1-I_2)$.

The changeover point between the two read-out modes is the lock-in threshold drawn in FIG. 2. A difficulty with this procedure may result from the fact that the scale factor in the vicinity of the lock-in threshold is non-linear both for the amplitude-modulated signal below the lock-in threshold and also for the frequency-modulated signal above the lock-in threshold.

Of course the lock-in threshold cannot be shifted indefinitely close to the zero point. Hitherto the best value achieved was 30°/h. However by relatively simple means the lock-in threshold in ring lasers can be displaced upwards as far as desired. Thereby it is possible to operate the sensor over a wide range of angular velocity, below the lock-in threshold, and to use only the amplitude-modulated $(I_1-I_2)$ signal for measuring the angular velocity.

The advantage of this read-out procedure lies in the fact that all the problems associated with the lock-in effect are avoided. Sensors of this type are extremely simple in construction, since both the bias technique for avoiding the lock-in effect and also the known type of read-out optics can be dispensed with. A sensor of this type belongs to the concept of "cheap sensors" of a lower grade of accuracy, and may perhaps best be compared with the passive optical angular velocity sensors of the Sagnac type. With a sensor of this type rotation speeds of $2\times 10^{-2}$°/sec can be demonstrated, a value which is clearly better than those achieved hitherto with glass-fibre interferometers and passive ring resonators.

What I claim as my invention and desired to secure by Letters Patent of the United States is:

1. An angular velocity sensor based on a ring laser comprising two photo-receivers for decoupled beam components of the two oppositely-directed wave trains, an adder for the output signals of the two photo-receivers, a device for stabilizing the length of cavity of the ring laser depending on the sum signal, and a subtractor for the output signals of the two photo-receivers, characterized in that the ring laser is formed in such a way that the angular velocity region to be measured is within the lock-in region, and that a device is provided for determining the size and sign of the output signal of the subtractor to determine the size and sign of the rotational speed.

* * * * *